(12) United States Patent
Ichitsuka et al.

(10) Patent No.: US 10,549,334 B2
(45) Date of Patent: Feb. 4, 2020

(54) DEVICE FOR MANUFACTURING COIL SPRING AND METHOD FOR MANUFACTURING COIL SPRING

(71) Applicant: NHK SPRING CO., LTD., Yokohama-shi, Kanagawa (JP)

(72) Inventors: Yuu Ichitsuka, Yokohama (JP); Yuji Mori, Yokohama (JP)

(73) Assignee: NHK SPRING CO., LTD., Yokohama-Shi (JP)

( * ) Notice: Subject to any disclaimer, the term of this patent is extended or adjusted under 35 U.S.C. 154(b) by 75 days.

(21) Appl. No.: 15/688,570

(22) Filed: Aug. 28, 2017

(65) Prior Publication Data

US 2017/0355011 A1 Dec. 14, 2017

Related U.S. Application Data

(63) Continuation of application No. PCT/JP2016/053406, filed on Feb. 4, 2016.

(30) Foreign Application Priority Data

Feb. 27, 2015 (JP) ................................. 2015-038709

(51) Int. Cl.
  *B21F 3/04* (2006.01)
  *B21F 35/00* (2006.01)
  *F16F 1/04* (2006.01)
(52) U.S. Cl.
  CPC ................ *B21F 3/04* (2013.01); *B21F 35/00* (2013.01); *F16F 1/04* (2013.01)
(58) Field of Classification Search
  CPC ............. B21F 3/04; B21F 35/00; B21F 35/02
  See application file for complete search history.

(56) References Cited

U.S. PATENT DOCUMENTS

| 4,576,028 A | 3/1986 | Morita |
| 4,715,202 A | 12/1987 | Shibata et al. |
| 4,884,428 A | 12/1989 | Matsuura |

(Continued)

FOREIGN PATENT DOCUMENTS

| DE | 3713112 A1 | 10/1987 |
| DE | 102009020666 A1 | 11/2010 |

(Continued)

OTHER PUBLICATIONS

Extended European Search Report (EESR) dated Oct. 5, 2018 issued in counterpart European Application No. 16755169.6.

(Continued)

*Primary Examiner* — Teresa M Ekiert
(74) *Attorney, Agent, or Firm* — Holtz, Holtz & Volek PC (57) ABSTRACT

A coil spring manufacturing device includes a mandrel around which a wire is wound, a feed mechanism which feeds the wire toward the mandrel, guide members which guide the wire, a chuck which fixes a distal end of the wire, and a clamp mechanism. The clamp mechanism sandwiches the wire from both sides before the distal end of the wire reaches the mandrel. Further, the clamp mechanism can be rotated about a fulcrum by rotation actuator, and can also be slid in a direction along an axis of the mandrel by sliding actuator. In a state in which the wire is sandwiched by the clamp mechanism, the clamp mechanism is rotated, and if necessary, is slid. Thereby, a bent portion for a negative pitch portion of a coil spring is formed at a part of the wire.

6 Claims, 7 Drawing Sheets

(56) References Cited

U.S. PATENT DOCUMENTS

| | | |
|---|---|---|
| 2010/0050725 A1 | 3/2010 | Jung |
| 2010/0052231 A1 | 3/2010 | Eto |
| 2012/0013059 A1 | 1/2012 | Hamano et al. |
| 2013/0062821 A1 | 3/2013 | Eto |

FOREIGN PATENT DOCUMENTS

| | | |
|---|---|---|
| EP | 2069091 B1 | 9/2015 |
| JP | 61020641 A | 1/1986 |
| JP | 2004183869 A | 7/2004 |
| JP | 2009061505 A | 3/2009 |
| JP | 2010242835 A | 10/2010 |
| KR | 100807148 B1 | 3/2008 |
| WO | 2008035833 A1 | 3/2008 |

OTHER PUBLICATIONS

International Search Report (ISR) and Written Opinion dated May 10, 2016 issued in International Application No. PCT/JP2016/053406.

DEVICE FOR MANUFACTURING COIL SPRING AND METHOD FOR MANUFACTURING COIL SPRING

CROSS-REFERENCE TO RELATED APPLICATIONS

This application is a Continuation Application of PCT Application No. PCT/JP2016/053406, filed Feb. 4, 2016 and based upon and claiming the benefit of priority from prior Japanese Patent Application No. 2015-038709, filed Feb. 27, 2015, the entire contents of all of which are incorporated herein by reference.

BACKGROUND OF THE INVENTION

1. Field of the Invention

The present invention relates to a device for manufacturing a coil spring and a method for manufacturing a coil spring, in particular, a manufacturing device and a manufacturing method suitable for manufacturing a coil spring including an end turn portion of a negative pitch.

2. Description of the Related Art

A coil spring manufacturing device which forms (coils) a material of a coil spring by hot forming, in order to manufacture a coil spring for use in a suspension mechanism, etc., of a vehicle, is known. The material of the coil spring is a bar-like wire formed of spring steel. JPS61-20641 A (Patent Literature 1) or JP 2010-242835 A (Patent Literature 2) discloses an example of the coil spring manufacturing device. The coil spring manufacturing device disclosed in these literatures includes a mandrel, a rotation mechanism which rotates the mandrel, a feed mechanism which feeds a heated wire toward the mandrel, a chuck which holds a distal end of the wire, and a guide mechanism. The guide mechanism guides the wire such that the wire is wound around the mandrel at a predetermined pitch.

Figure 8:
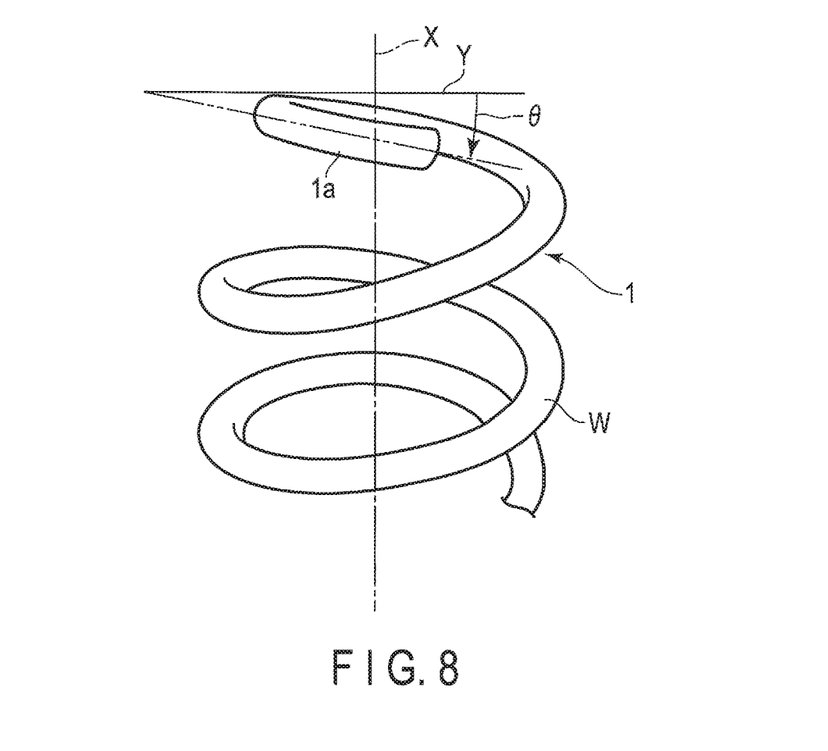
FIG. 8 is a perspective view showing a part of a coil spring having an end turn portion of a negative pitch.

A coil spring used in a suspension mechanism of a vehicle produces a repulsive force by being compressed between a lower end turn portion and an upper end turn portion. The form of the coil spring can be various according to the specification of the suspension mechanism. A coil spring 1 as shown in FIG. 8, for example, includes an end turn portion 1a of a negative pitch for optimizing a force line position (FLP) of the coil spring 1. The end turn portion 1a of the negative pitch has a negative pitch angle (−θ) with respect to a line segment Y orthogonal to a central axis X of the coil spring 1.

As a means for forming the end turn portion of a negative pitch, arranging a pair of clamp members in the middle of a movement path of a wire has been proposed, although this is not disclosed to the public. A coil spring manufacturing device including the clamp members forms a bent portion for the end turn portion of a negative pitch at a distal end portion of the wire by sandwiching the distal end portion of the wire between the clamp members just before the wire is wound around the mandrel.

However, by merely sandwiching the distal end portion of the wire between the clamp members, a length and an angle of the bent portion for the end turn portion of the negative pitch are restricted by the shape or arrangement of the clamp members.

Accordingly, a conventional coil spring manufacturing device has a problem such as the length of a negative pitch portion or a negative pitch angle being small, and thus, the conventional coil spring manufacturing device leaves room for improvement in order to form a portion of a desired negative pitch.

BRIEF SUMMARY OF THE INVENTION

Accordingly, an object of the present invention is to provide a coil spring manufacturing device and a method of manufacturing a coil spring capable of increasing the length of a negative pitch portion and the negative pitch angle more than the conventional devices and methods could achieve.

A coil spring manufacturing device according to one embodiment of the present invention comprises a mandrel around which a wire (a material of a coil spring) is wound, a rotation mechanism including a mandrel drive head, a feed mechanism which feeds the wire toward the mandrel, a chuck provided on the mandrel drive head, guide members, a clamp mechanism, and rotation means. The mandrel drive head rotates the mandrel. The chuck fixes a distal end of the wire to the mandrel. The guide members are moved in a direction along an axis of the mandrel, and guide the wire that winds around the mandrel. The clamp mechanism is arranged between the mandrel and the feed mechanism, and sandwiches a part of the wire in a longitudinal direction of the wire (for example, an end turn portion which is to be formed in a negative pitch). The rotation means rotates the clamp mechanism in a direction of bending the wire in a state in which the wire is inserted into the clamp mechanism.

According to the embodiment, a bent portion for a negative pitch portion can be formed at a part of the wire of the coil spring (for example, the end turn portion), and the length and the angle of the negative pitch portion can be more increased than the conventional device and method could achieve.

In this embodiment, slide means for moving the clamp mechanism in the direction along the axis of the mandrel may further be provided. The clamp mechanism may include first clamp members which are arranged between the guide members and the feed mechanism, and second clamp members which are arranged on an upstream side in a direction of movement of the wire relative to the first clamp members. The rotation means may include a first rotation actuator for changing an orientation of the first clamp members, and a second rotation actuator which changes the second clamp members to be oriented in a direction opposite to the first clamp members. The slide means may include a first sliding actuator which moves the first clamp members in the direction along the axis, and a second sliding actuator which moves the second clamp members in the direction along the axis.

One embodiment may include a first chuck member for an end turn portion of a negative pitch, and a second chuck member for an end turn portion which is not of a negative pitch. The first chuck member is mounted on the mandrel drive head for coiling the end turn portion of the negative pitch. The second chuck member is mounted on the mandrel drive head, instead of the first chuck member, for coiling the end turn portion which is not of the negative pitch. A length of the first chuck member in the direction along the axis is greater than a length of the second chuck member.

Additional objects and advantages of the invention be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A coil spring manufacturing device according to a first embodiment will be described with reference to FIGS. 1 to 4.

Figure 1:
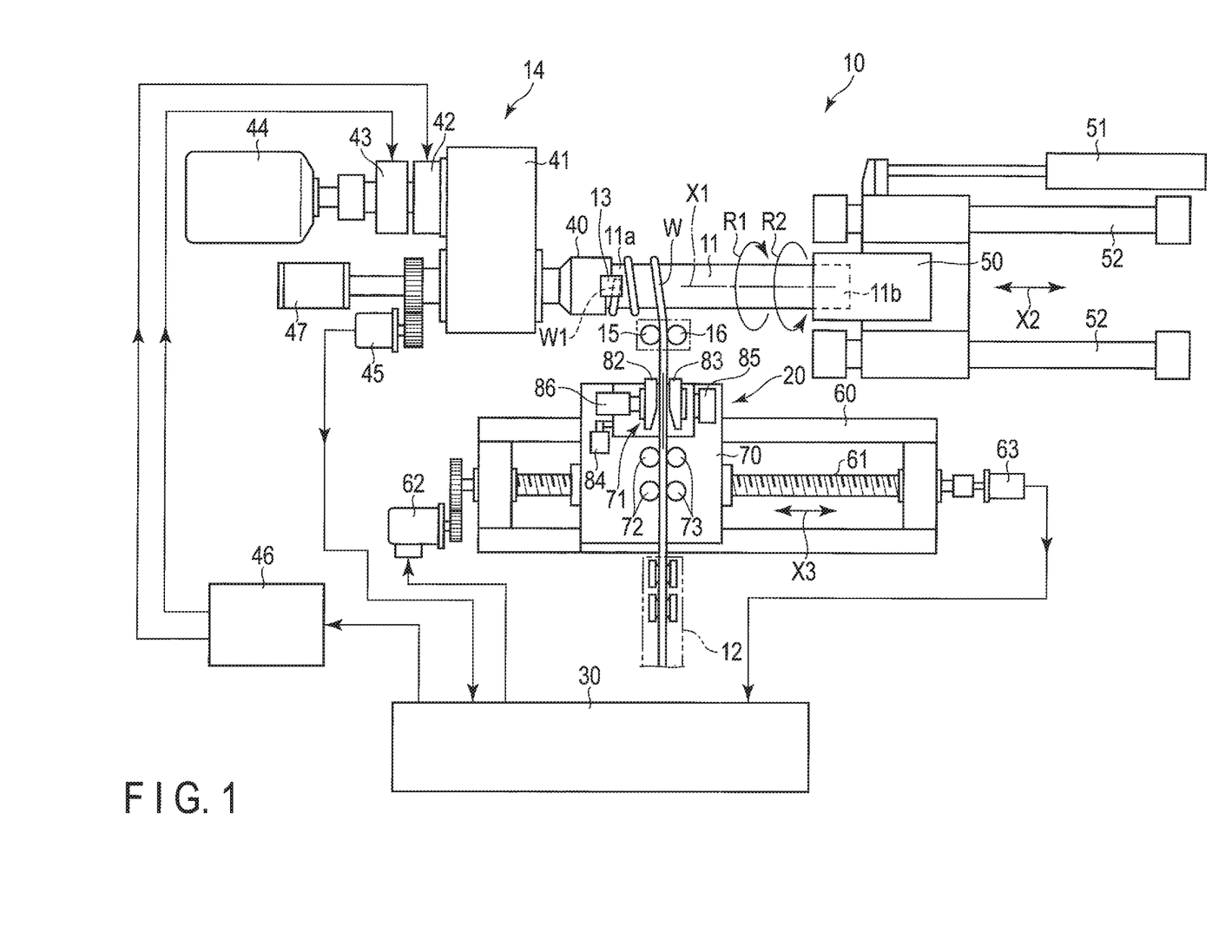
FIG. 1 is a plan view of a coil spring manufacturing device according to a first embodiment.

The coil spring manufacturing device 10 shown in FIG. 1 includes a mandrel 11, a feed mechanism 12, a chuck 13, a rotation mechanism 14, a pair of guide members 15 and 16, a clamp unit 20, and a control unit 30 which serves as control means. A material of the coil spring 1 is a bar-like wire W formed of spring steel. The wire W is wound around the mandrel 11. The feed mechanism 12 feeds the wire W to the mandrel 11. The chuck 13 fixes a distal end W1 of the wire W to the mandrel 11. The rotation mechanism 14 rotates the mandrel 11. The guide members 15 and 16 are arranged at a position distant from the mandrel 11 in proximity to the mandrel 11. The control unit 30 is constituted of an information processor such as a computer.

The feed mechanism 12 includes a plurality of feed rollers which are rotated by a motor, and moves the wire W toward the mandrel 11. The wire W may be shaped as a perfect circle in cross section, or may be elliptical, oval, or in a shape formed by combining a plurality of arcs in cross section. In one example, the mandrel 11 is columnar, but it may be formed in the other shape such as conical.

An end portion 11a on one side of the mandrel 11 is held by a mandrel drive head 40 of the rotation mechanism 14. The mandrel drive head 40 is rotated and driven by a motor 44 via a reduction gear mechanism 41, a brake 42, a clutch 43, etc. The reduction gear mechanism 41 is provided with a detector 45 which detects a rotation angle of the mandrel drive head 40.

The chuck 13 is removably fixed to the mandrel drive head 40 by fixing means 48 (FIG. 4) such as a bolt. The chuck 13 is moved radially relative to the mandrel 11 by an actuator 47, so that it can fix the distal end W1 of the wire W. The chuck 13 extends in a direction along an axis X1 of the mandrel 11 from an end surface 40a of the mandrel drive head 40.

Figure 6:
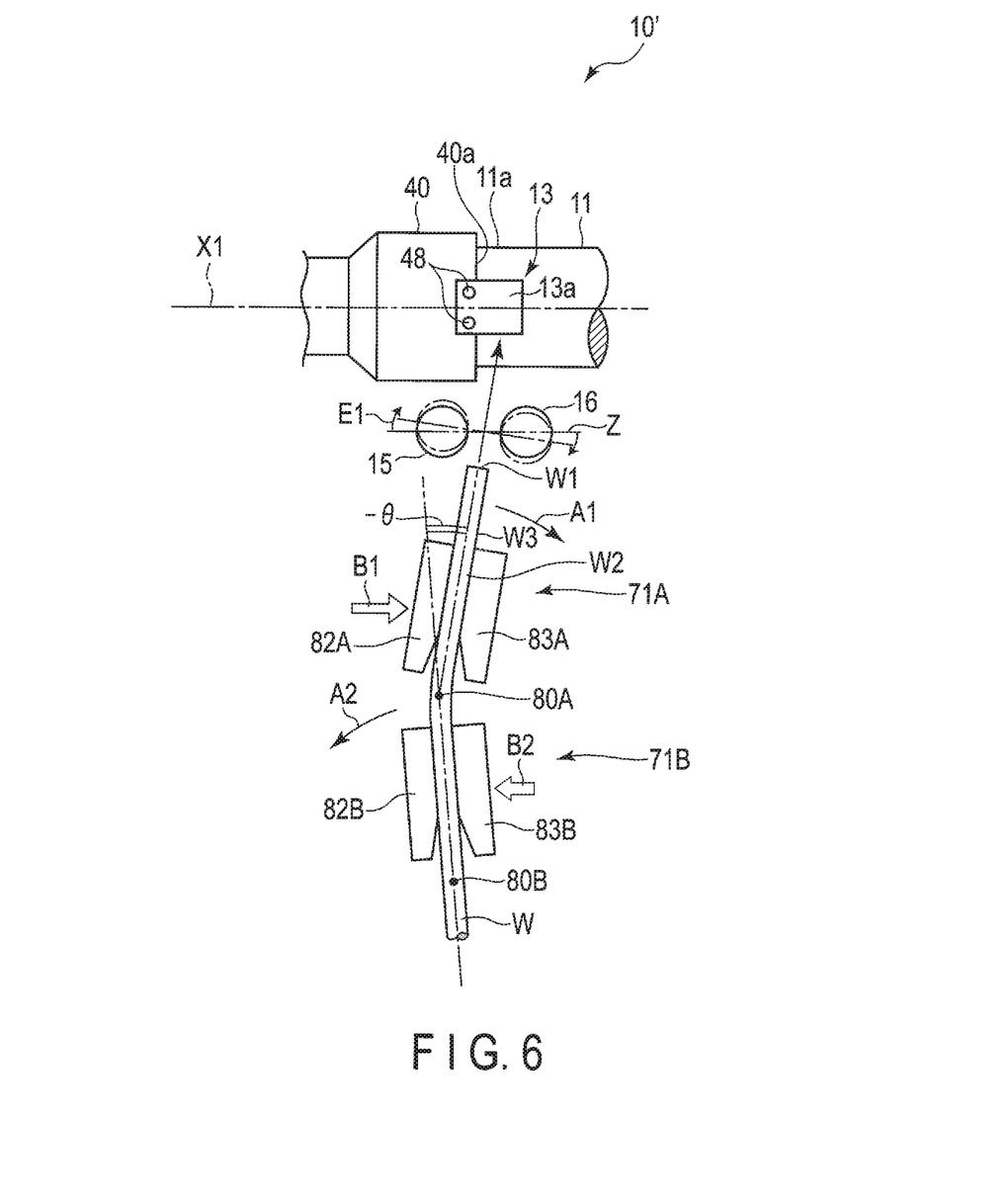
FIG. 6 is a plan view which schematically shows the coil spring manufacturing device shown in FIG. 5.
Figure 7:
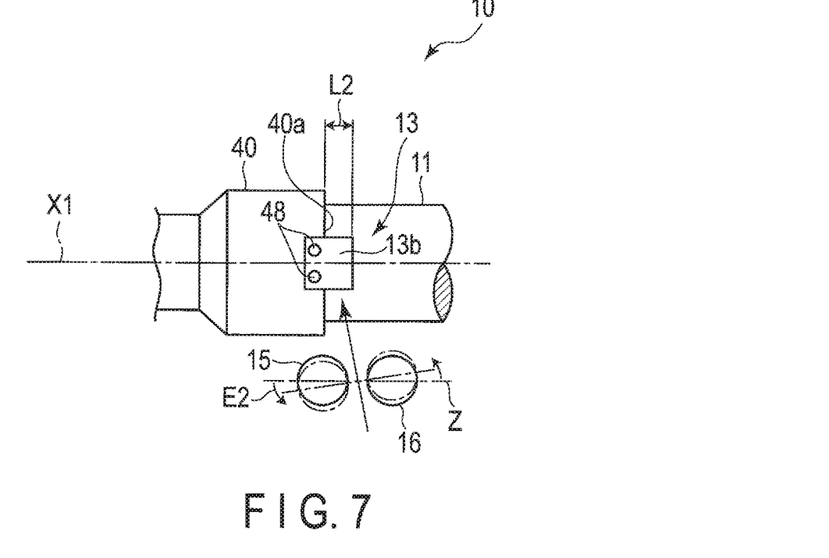
FIG. 7 is a plan view of a chuck used when forming an end turn portion which is not of a negative pitch.

The chuck 13 of the present embodiment includes a first chuck member 13a (FIGS. 4 and 6) and a second chuck member 13b (FIG. 7). The first chuck member 13a is mounted on the mandrel drive head 40 in coiling an end turn portion of a negative pitch. The second chuck member 13b is mounted on the mandrel drive head 40, instead of the first chuck member 13a, in coiling an end turn portion which is not of a negative pitch. Length L1 (FIG. 4) of the first chuck member 13a is greater than length L2 (FIG. 7) of the second chuck member 13b. L1 and L2 are lengths in the direction along the axis X1.

The reduction gear mechanism 41, the brake 42, the clutch 43, the motor 44, etc., constitute the rotation mechanism 14. The rotation mechanism 14 rotates the mandrel 11. The brake 42 and the clutch 43 are activated at a preset timing by a clutch/brake control unit 46. The clutch/brake control unit 46 is controlled by the control unit 30. For example, when the clutch 43 is activated, power of the motor 44 is transmitted to the mandrel drive head 40 via the reduction gear mechanism 41. In forming a clockwise coil spring, the mandrel 11 is rotated in a direction indicated by arrow R1 in FIG. 1. In forming an anticlockwise coil spring, the mandrel 11 is rotated in a direction indicated by arrow R2.

An end portion 11b on the other side of the mandrel 11 is rotatably supported by a mandrel holder 50. The mandrel holder 50 is driven by a cylinder mechanism 51. The mandrel holder 50 is moved in the direction along the axis X1 of the mandrel 11 (i.e., the direction indicated by arrow X2 in FIG. 1) along a guide rod 52.

The guide members 15 and 16 have the function of guiding the wire W that winds around the mandrel 11. The guide members 15 and 16 are moved in the direction along the axis X1 of the mandrel 11 by a drive mechanism comprising a ball screw and a servomotor. The guide members 15 and 16 are moved in accordance with a pitch angle of the coil spring 1 to be formed, and guide the wire W. In forming an end turn portion of a negative pitch, the wire W must be inclined in a negative pitch direction. Accordingly, as shown by arrow E1 in FIGS. 4 and 6, the guide members 15 and 16 are rotated by an amount corresponding to the negative pitch from a reference position Z that is parallel to the axis X1.

In the middle of a movement path of the wire W which is moved toward the mandrel 11, the clamp unit 20 which also serves as a guide of the wire W is arranged. The clamp unit 20 is arranged on the upstream side of the guide members 15 and 16 with respect to a direction of movement of the wire W. The clamp unit 20 includes a frame 60, a ball screw 61 provided on the frame 60, a servomotor 62 which rotates the ball screw 61, a detector 63 which detects rotation of the ball screw 61, a base member 70, a clamp mechanism 71 disposed on the base member 70, support members 72 and 73, etc. The frame 60 extends in the direction along the axis X1 of the mandrel 11. The base member 70 is moved in the direction along the axis X1 by the ball screw 61. Note that a fluid pressure cylinder such as an air cylinder may be used as a driving source instead of the servomotor 62 which rotates the ball screw 61. In forming the end turn portion of a negative pitch, depending on the magnitude of a negative pitch angle, the support members 72 and 73 may obstruct movement of the wire W. In that case, at least one of the support members, i.e., the support member 72, may be removed.

A movement mechanism is constituted of the screw ball 61, the servomotor 62, the detector 63, etc. The base member 70 is moved in the direction along the axis X1 of the mandrel 11 (i.e., the direction indicated by arrow X3 in FIG. 1) by this movement mechanism. A rotational position of the ball screw 61 is detected by the detector 63. A position of the base member 70 is calculated on the basis of the rotational position of the ball screw 61 which has been detected. The position of the base member 70 is fed back to the servomotor 62. Although an example of the servomotor 62 is a DC servomotor, an AC servomotor, a pulse motor, a hydraulic servomotor, or the like may be used.

Figure 2:
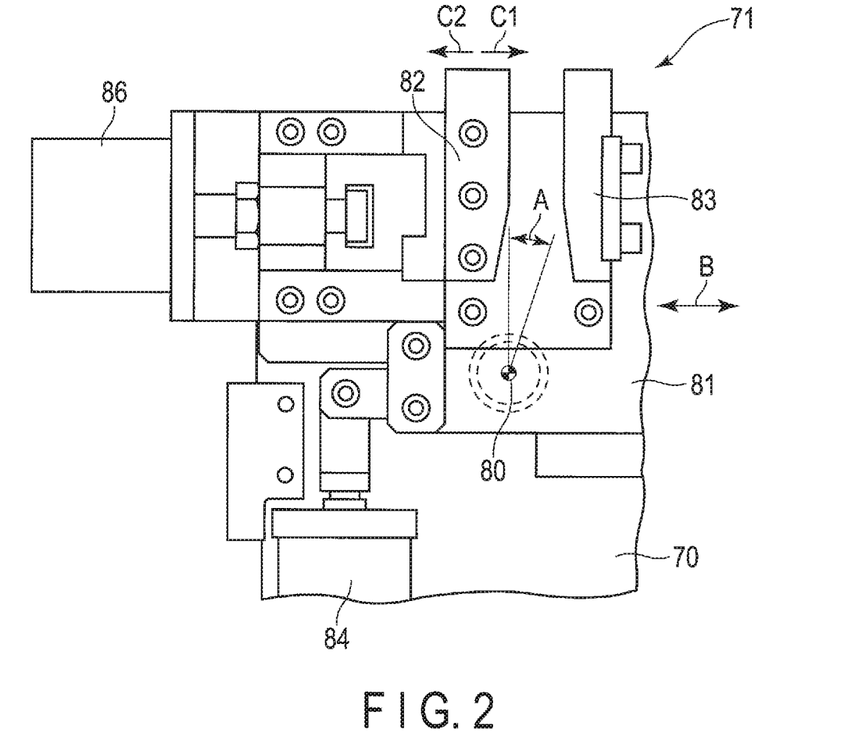
FIG. 2 is a plan view showing a clamp mechanism of the coil spring manufacturing device shown in FIG. 1 in an enlarged scale.

FIG. 2 is a plan view showing a part of the clamp mechanism 71 in an enlarged scale. The clamp mechanism 71 includes a movable base 81, a pair of clamp members 82 and 83 disposed on the movable base 81, a rotation actuator 84 which rotates the movable base 81, a sliding actuator 85 (FIG. 1), and a clamping actuator 86. The movable base 81 is rotated in a direction indicated by arrow A about a fulcrum 80. The sliding actuator 85 slides the movable base 81 in a direction indicated by arrow B. The clamping actuator 86 drives the clamp members 82 and 83 in a clamping position and an unclamping position.

The movable base 81 is rotated in the direction indicated by arrow A (FIG. 2) about the fulcrum 80 by the rotation actuator 84. That is, the movable base 81 rotates in a plane along the axis X1 of the mandrel 11. When the movable base 81 is rotated about the fulcrum 80, because the clamp members 82 and 83 are rotated in the plane along the axis X1 of the mandrel 11, the orientation of the clamp members 82 and 83 is changed. The rotation actuator 84 functions as the rotation means for changing the orientation of the clamp members 82 and 83.

The movable base 81 is moved in the direction along the axis X1 of the mandrel 11 by the sliding actuator 85 (FIG. 1). The sliding actuator 85 functions as the slide means for moving the clamp members 82 and 83. By the slide means, the clamp members 82 and 83 are moved in the direction along the axis X1 of the mandrel 11 (i.e., the direction indicated by arrow B in FIG. 2).

At least one of the clamp members, i.e., the clamp member 82, is driven in a first direction indicated by arrow C1 in FIG. 2 and a second direction indicated by arrow C2 by the clamping actuator 86. More specifically, the clamp mechanism 71 moves between a position of clamping the wire W (the clamping position) and a position of releasing the wire W (the unclamping position). The clamping actuator 86 functions as the means for moving the clamp member 82 between the clamping position and the unclamping position.

An electric actuator can be adopted for each or the rotation actuator 84, the sliding actuator 85, and the clamping actuator 86. The electric actuator includes a ball screw and a servomotor. Instead of the electric actuator, a fluid pressure actuator such as a hydraulic servomotor may be adopted.

Figure 4:
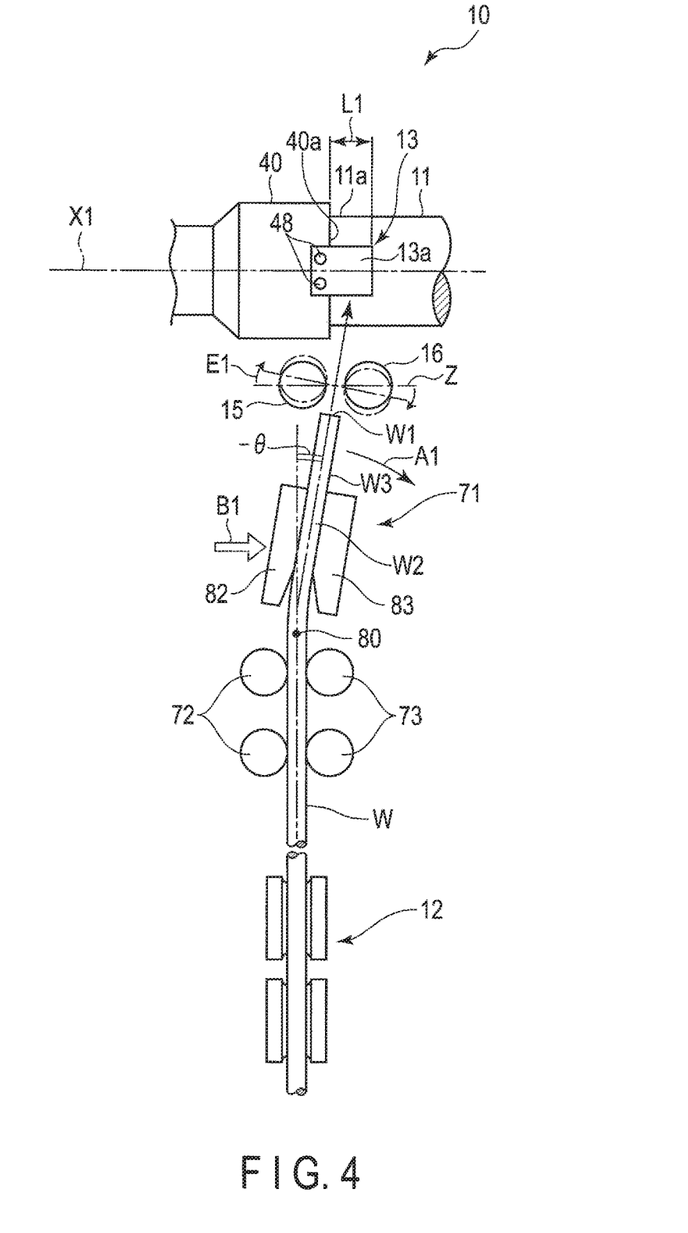
FIG. 4 is a plan view which schematically shows the coil spring manufacturing device shown in FIG. 1.

As shown in FIGS. 1 and 4, the support members 72 and 73 are arranged on the upstream side relative to the clamp members 82 and 83 (the upstream side with respect to the direction of movement of the wire W). The wire W which has been conveyed to the support members 72 and 73 by the feed mechanism 12 passes through a space between the support members 72 and 73. Further, the wire W passes through a space between the clamp members 82 and 83. When the wire W passes through the space between the clamp members 82 and 83, the clamp members 82 and 83 are in the unclamping position. Further, the wire W passes through a space between the guide members 15 and 16, and proceeds to the mandrel 11.

The control unit 30 (FIG. 1) has the function of controlling the rotation mechanism 14, the clamp unit 20, etc. For example, a signal regarding a rotational position of the mandrel drive head 40 is detected by the detector 45. This signal is input to the control unit 30. In the control unit 30, data regarding a shape of the coil spring to be formed, a pitch angle, etc., is input by a predetermined method (for example, by way of a keyboard input or a recording medium) in advance. The positions of the guide members 15 and 16 and the clamp unit 20 (i.e., the positions in the direction along the axis X1 of the mandrel 11) are controlled, on the basis of the data input to the control unit 30 and the rotational position of the mandrel drive head 40.

Next, the operation of the coil spring manufacturing device 10 according to the present embodiment will be described.

Figure 3:
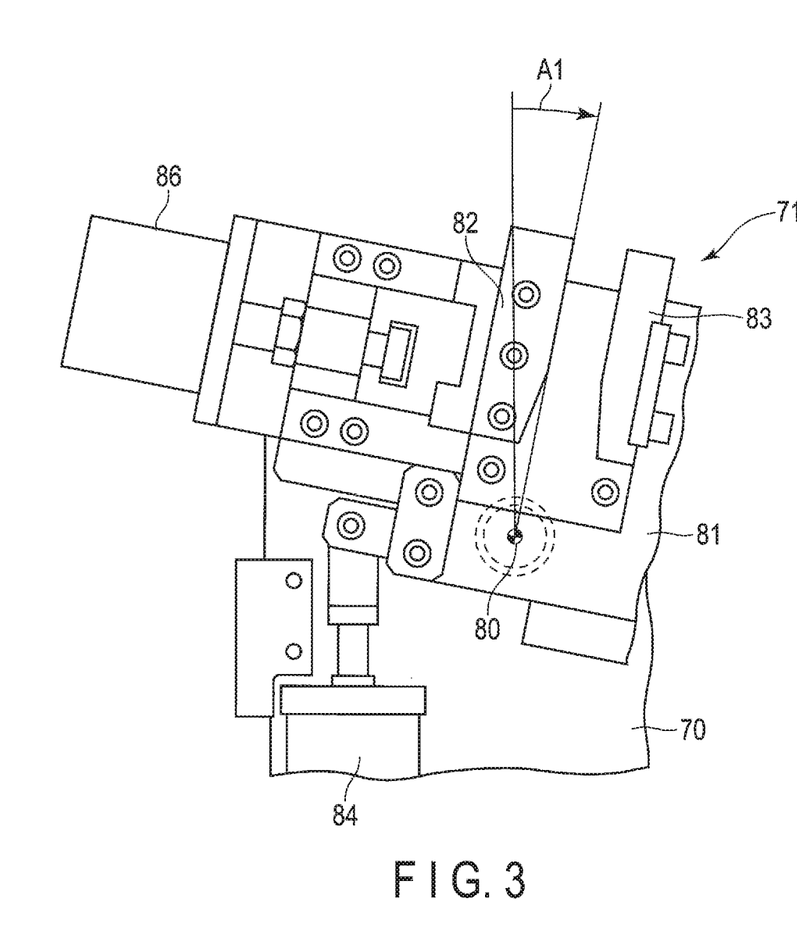
FIG. 3 is a plan view of a state in which the clamp mechanism shown in FIG. 2 is rotated.

FIG. 2 shows the state in which the clamp mechanism 71 is waiting in a first position (initial position). FIG. 3 shows the state in which the clamp mechanism 71 is rotated in a direction indicated by arrow A1 about the fulcrum 80. When the clamp mechanism 71 is moved to a second position by being rotated in the direction of arrow A1, the orientation of the clamp members 82 and 83 is changed. FIG. 4 schematically represents a part of the coil spring manufacturing device 10 when the end turn portion of a negative pitch is to be coiled, and a part of the wire W.

The wire W supplied to the mandrel 11 is heated to a temperature higher than $A_1$ transformation point by a heating furnace in advance. The heated wire W is moved toward the mandrel 11 by the feed mechanism 12. Further, a distal end of the wire N passes through the space between the support members 72 and 73 and is inserted between the clamp members 82 and 83.

In coiling the end turn portion of a negative pitch, at the point when a predetermined length of the wire W from the distal end W1 of the same reaches the clamp members 82 and 83, supply of the wire W is temporarily stopped. Further, as the clamp members 82 and 83 are moved to the clamping position, the wire W is sandwiched between the clamp members 82 and 83. In this state, as shown in FIG. 4, the clamp members 82 and 83 change the orientation in the direction indicated by arrow A1 about the fulcrum 80. The clamp members 82 and 83 are slid in a direction indicated by arrow B1 if necessary. A distal end portion W3 of the wire W is bent in this way, and a bent portion W2 having an angle $-\theta$ for the end turn portion of a negative pitch is formed.

After the bent portion W2 has been formed in the wire W, the clamp members 82 and 83 are returned to the first position (the initial position shown in FIG. 2). Further, as the clamp members 82 and 83 are moved to the unclamping position, the wire W is released, and the wire W is moved toward the mandrel 11. When the distal end W1 of the wire W is inserted into the chuck 13, the chuck drive actuator 47 is operated. The distal end W1 of the wire W is fixed to the mandrel 11 by the chuck 13.

In a state in which the distal end W1 of the wire W is fixed by the chuck 13, the mandrel 11 is rotated while the wire W is being supplied toward the mandrel 11 by the feed mechanism 12. Further, in synchronization with the rotation of the mandrel 11, the guide members 15 and 16 and the clamp unit 20 move in the direction along the axis X1 of the mandrel 11. The wire W is thereby wound around the mandrel 11 at a predetermined pitch while being guided by the guide members 15 and 16.

As shown in FIG. 4, the bent portion W2 is formed in the distal end portion W3 of the wire W. As this bent portion W2 is wound around the mandrel 11, the end turn portion 1a (FIG. 8) of the negative pitch is formed.

When the winding of the wire W around the mandrel 11 is finished, a signal is sent to the clutch/brake control unit 46 by the control unit 30, and the rotation of the mandrel 11 is stopped. Also, as the servomotor 62 performs a return operation, the guide members 15 and 16 and the clamp unit 20 are returned to the initial position. Further, the cylinder mechanism 51 is operated, and the mandrel holder 50 is moved in a direction away from the end portion 11b of the mandrel 11. When the mandrel holder 50 is away from the mandrel 11, the formed coil spring can be taken out of the mandrel 11. After the coil spring has been taken out of the mandrel 11, the mandrel holder 50 is returned to its original position by the cylinder mechanism 51, and the initial state is brought back.

The coil spring manufacturing device 10 according to the present embodiment includes the clamp mechanism 71 which changes the orientation about the fulcrum 80. Moreover, the clamp mechanism 71 can be slid in a direction along the axis X1 of the mandrel 11. By such a clamp mechanism 71, the bent portion W2 can be formed at a part of the wire W in advance before the wire W is wound around the mandrel 11. Accordingly, the length of the negative pitch portion (for example, the end turn portion of the negative pitch) of the coil spring and the negative pitch angle can be more increased than with a conventional coil spring manufacturing device.

A method of manufacturing the coil spring according to the present embodiment described above includes the following sequential steps:

(1) Feeding the wire W toward the mandrel 11.

(2) Sandwiching the distal end portion W3 of the wire by the clamp mechanism 71 from both sides before the distal end W1 of the wire reaches the mandrel 11.

(3) Changing the orientation of the clamp mechanism 71 in a state in which the distal end portion W3 of the wire is sandwiched by the clamp mechanism 71, and moving the clamp mechanism 71 in the direction along the axis X1 of the mandrel 11.

(4) Fixing the distal end W1 of the wire which has reached the mandrel 11 onto the mandrel 11 by the chuck 13.

(5) Rotating the mandrel 11.

(6) Winding the wire W around the mandrel 11 while guiding the wire W in the direction along the axis X1 of the mandrel 11 by the guide members 15 and 16.

Figure 5:
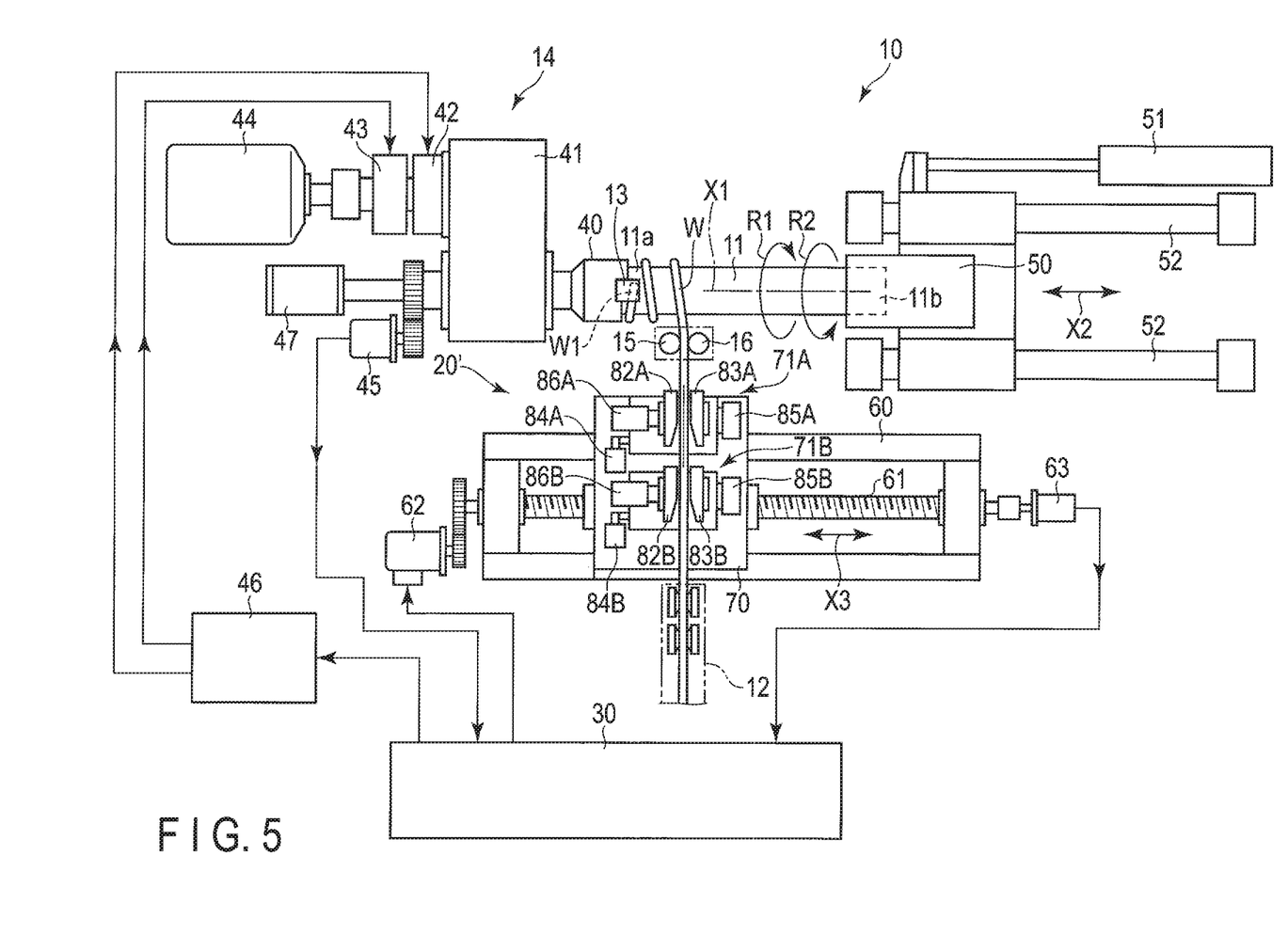
FIG. 5 is a plan view of a coil spring manufacturing device according to a second embodiment.

FIGS. 5 and 6 show a coil spring manufacturing device 10' according to a second embodiment. A clamp unit 20' of the coil spring manufacturing device 10' according to the present embodiment includes a first clamp mechanism 71A and a second clamp mechanism 71B. The first clamp mechanism 71A is rotated about a first fulcrum 80A (FIG. 6). The second clamp mechanism 71B is rotated about a second fulcrum 80B (FIG. 6).

The first clamp mechanism 71A includes first clamp members 82A and 83A, a first rotation actuator 84A, a first sliding actuator 85A, and a first clamping actuator 86A. The first rotation actuator 84A functions as first rotation means. The first rotation means changes the orientation of the first clamp members 82A and 83A. The first sliding actuator 85A functions as first slide means. The first slide means moves the first clamp members 82A and 83A in a direction along an axis X1 of a mandrel 11. The first clamping actuator 86A drives the first clamp members 82A and 83A a clamping position and an unclamping position.

The second clamp mechanism 71O includes second clamp members 82B and 83B, a second rotation actuator a second sliding actuator 85B, and a second clamping actuator 86B. The second rotation actuator 84B functions as second rotation means. The second rotation means changes the orientation of the second clamp members 82B and 83B. The second sliding actuator 85B functions as second slide means. The second slide means moves the second clamp members 82B and 83B in the direction along the axis X1 of the mandrel 11. The second clamping actuator 86B drives the second clamp members 82B and 83B in a clamping position and an unclamping position.

As shown in FIG. 6, a portion of a wire W in a longitudinal direction of the wire W (a portion which should be formed in a negative pitch) is sandwiched between the first clamp mechanism 71A and the second clamp mechanism 71B. In this state, the first clamp mechanism 71A is rotated in a direction indicated by arrow A1, and the first clamp mechanism 71A is slid in a direction indicated by arrow B1. Further, the second clamp mechanism 71B is rotated in a direction opposite to the first clamp mechanism 71A (the direction indicated by arrow A2). If necessary, the second clamp mechanism 71B is slid in a direction indicated by arrow B2. By controlling the movement of the first clamp mechanism 71A and the second clamp mechanism 71B in this way, an angle −θ of a bent portion W2 for forming a part such as an end turn portion of a negative pitch can further be increased.

In coiling an end turn portion which is not of a negative pitch (a zero pitch or a positive pitch), a second chuck member 13b is mounted on a mandrel drive head 40 to perform the coiling, as shown in FIG. 7. Length L2 (FIG. 7) of the second chuck member 13b is less than length L1 (FIG. 4) of the first chuck member 13a. In forming the end turn portion of a positive pitch, guide members 15 and 16 are rotated in a direction opposite to that of a negative pitch (i.e., the direction indicated by arrow E2 in FIG. 7).

Needless to say, in carrying out the present invention, in addition to the form of the coil spring, the specific form of the coil spring manufacturing device, including the feed mechanism of a wire, the mandrel, the rotation mechanism of the mandrel, the guide members which guide the wire, and the clamp mechanism, may be variously modified without departing from the technical concept of the invention. Further, the coil spring manufacturing device of the present invention can also be used in forming a negative pitch portion other than the end turn portion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring manufacturing device comprising:
   a mandrel around which a wire is wound;
   a rotation mechanism including a mandrel drive head which rotates the mandrel;
   a feed mechanism comprising rollers and a first motor which rotates the rollers, the feed mechanism feeding the wire toward the mandrel;

a chuck provided on the mandrel drive head, the chuck fixing a distal end of the wire to the mandrel;

a pair of guide members, the pair of guide members being movable in a direction along an axis of the mandrel by a drive mechanism comprising a second motor, and the wire passing between the guide members such that the wire is guided by the guide members while the wire winds around the mandrel;

a clamp mechanism comprising at least one pair of clamp members, the clamp mechanism being arranged between the mandrel and the feed mechanism and sandwiching a part of the wire in a longitudinal direction of the wire between the at least one pair of clamp members;

a pair of support members between which the wire passes, the support members being arranged on an upstream side in a direction of movement of the wire relative to the clamp members; and a first actuator which rotates the clamp members in a direction such that a distal end portion of the wire is bent in a negative pitch direction in a state in which the wire is inserted between the support members and between the clamp members.

2. The coil spring manufacturing device of claim 1, further comprising a second actuator configured to move the clamp members in the direction along the axis.

3. The coil spring manufacturing device of claim 1, wherein the at least one pair of clamp members includes:

a first pair of clamp members arranged between the guide members and the feed mechanism; and a second pair of clamp members arranged on an upstream side in the direction of movement of the wire relative to the first pair of clamp members, and wherein the first actuator includes:

a first rotation actuator which changes an orientation of the first clamp members; and a second rotation actuator which changes the second clamp members to be oriented in a direction opposite to the first clamp members.

4. The coil spring manufacturing device of claim 3, further comprising:

a first sliding actuator which moves the first pair of clamp members in the direction along the axis; and a second sliding actuator which moves the second pair of clamp members in the direction along the axis.

5. The coil spring manufacturing device of claim 1, wherein:

the chuck comprises a first chuck member which coils an end turn portion of a negative pitch;

the first chuck member is removably fixed to the mandrel drive head so as to be replaceable with a second chuck member which coils an end turn portion which is not of a negative pitch; and a length of the first chuck member in the direction along the axis when the first chuck member is fixed to the mandrel drive head is greater than a length of the second chuck member in the direction along the axis when the second chuck member is fixed to the mandrel drive head.

6. A method of manufacturing a coil spring comprising:

feeding a wire toward a mandrel;

inserting the wire between support members and between clamp members;

sandwiching a distal end portion of the wire in a longitudinal direction of the wire by the clamp members from opposite sides before a distal end of the wire reaches the mandrel;

changing an orientation of the clamp members in a direction such that a distal end portion of the wire, which is inserted between the support members and between the clamp members, is bent in a negative pitch direction in a state in which the distal end portion of the wire is sandwiched by the clamp members, and thereafter moving the clamp members to an unclamping position;

moving the wire toward the mandrel;

fixing the distal end of the wire which has reached the mandrel onto the mandrel by a chuck;

rotating the mandrel; and winding the wire around the mandrel while guiding the wire in a direction along an axis of the mandrel by guide members.

* * * * *